United States Patent

[11] 3,621,075

| [72] | Inventor | James W. Cleary<br>Bartlesville, Okla. |
|---|---|---|
| [21] | Appl. No. | 868,276 |
| [22] | Filed | Oct. 8, 1969 |
| [45] | Patented | Nov. 16, 1971 |
| [73] | Assignee | Phillips Petroleum Company<br>Continuation-in-part of application Ser. No.<br>640,186, May 22, 1967, now abandoned.<br>This application Oct. 8, 1969, Ser. No.<br>868,276 |

[54] DYEABLE POLYOLEFINS AND METHOD FOR PRODUCING SAME
11 Claims, 4 Drawing Figs.

[52] U.S. Cl. .................................................... 260/857 L,
260/45.7 S, 260/45.85, 260/45.95, 260/78 R,
260/78 S, 260/895
[51] Int. Cl. ...................................................... C08g 41/04
[50] Field of Search ............................................ 260/857
OL; 8/168

[56] References Cited
UNITED STATES PATENTS

| 3,320,334 | 5/1967 | Bonvicini .................... | 260/857 |
|---|---|---|---|
| 3,331,888 | 7/1967 | Cantatore.................... | 260/857 |
| 3,361,843 | 1/1968 | Miller........................... | 260/857 |
| 3,433,853 | 3/1969 | Earle et al.................... | 260/857 |

*Primary Examiner*—Paul Lieberman
*Attorney*—Young and Quigg

ABSTRACT: The dye receptivity of polyolefins is improved by mixing 100 parts by weight of at least one polymer or copolymer of a 1-olefin having two through eight carbon atoms per molecule with one to 20 parts by weight of a novel dye-receptive nonbasic polyamide modifier produced by polycondensing a diamine of which both amino groups are secondary with a hydrocarbon dicarboxylic acid.

INVENTOR.
J. W. CLEARY

BY
Young & Quigg

ATTORNEYS

DYEABLE POLYOLEFINS AND METHOD FOR PRODUCING SAME

This application is a continuation-in-part application of my copending application having Ser. No. 640,186, filed May 22, 1967 now abandoned.

This invention relates to the preparation of compositions from polyolefins having improved dye receptivity. In another aspect, this invention relates to novel compounds which can be mixed with polyolefins to improve their dye receptivity.

Polyolefins can be formed into shaped articles, including fibers, yarns, films, tapes, etc., having exceptional mechanical and chemical characteristics, such as mechanical strength, high elasticity, high tenacity, low density, and good resistance to chemicals. Many of these polyolefins, particularly crystalline polypropylene, exhibit poor receptivity to dye stuffs. This latter characteristic of the polyolefins limits their practical utilization, especially in the textile fiber field, in spite of the aforementioned desirable properties.

Several methods have been proposed for obtaining dye-receptive fibers from polyolefins including extrusion of blends of polyolefins with polymeric substance and treatments of the fibers such as graft polymerization processes, sulfonation, and the like. One prior art method includes the blending of polyamides, such as nylon, with polypropylene to produce a material having dye receptivity. Only very small improvements are possible, however, with nylons.

Another prior art dye acceptor additive is a basic polyamide prepared by the polycondensation of a dicarboxylic acid and a polyamine having two primary and one or more secondary amine groups such as diethylenetriamine and triethylenetetramine. Thus, the amine groups not participating in the amidation reaction, generally the secondary amine groups, provide the basicity for the basic polyamide. Although improvements in dye acceptability are obtained, other disadvantages, such as undesirable branching and cross-linking during spinning, are found to take place.

Still other prior art dye acceptor additives are basic polyamides formed by the polycondensation of a diacid with a polyamine having not more than two primary amino groups and one or more tertiary amino groups. With such polyamides the tertiary amino group, which cannot participate in the amidation reaction, provides the basicity for the basic polyamide.

Still other prior art dye acceptor additives are basic polyamides containing tertiary amines in which the tertiary amine group is provided not by the polyamine but by the diacid molecule. Such basic polyamides are prepared by the reaction of a diester containing a piperazine ring with a diamine, the diester being characterized by the formula

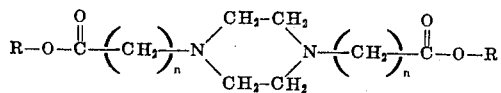

wherein $n$ is 1–10 and R is an alkyl group.

Although these latter two basic polyamide additives apparently overcame the branching and cross-linking problems of the former additive, most basic polyamides still exhibit an instability to high-temperature processing conditions in the presence of air. Thus, basic polyamide additives require the use of inert atmosphere conditions to prevent their decomposition into highly colored materials which discolor the host polyolefin polymers thus defeating the original purpose of the additive.

I have found that by mixing novel nonbasic polyamides, having a more complex structure than conventional, commercial nylon, with polyolefins that a material having improved dye receptivity is produced.

An important finding of the present invention is that it is not necessary to use basic polyamides, such as those whose basicity is provided by the presence of free secondary or tertiary amino groups in the repeating unit of the polymer, as points of attachment for dye molecules when such polyamides are dispersed within a polyolefin host polymer. The elimination of such basic groups has provided relief from the various problems associated with them. A common problem of such basic polyamides is their relative instability under the typical high-temperature processing conditions of the host polyolefin. In a number of tests, the nonbasic polyamides of the present invention have been found to be essentially free from this high-temperature discoloration while other closely related but basic polyamides have exhibited this discoloration problem to a high degree. This can be more clearly seen in later described examples.

The specific reasons for the success of the invention dye-acceptor additives are not know with certainty. It is speculated that the molecular configuration at, and in the immediate vicinity of, the amide group of the repeating polymeric unit is particularly adapted for providing suitable points of attachment for the dye molecules. Thus, while conventional polyamides such as the commercial nylons, characterized by the presence of a –NHCO– group, are essentially unsatisfactory as dye-receptor additives, the polyamides of the present invention, characterized in one respect by the presence of a

group, have been found to be very effective.

Still another speculative reason contributing to the success of the invention additive is the absence of any hydrogen atoms on the nitrogen atom of the amide group of the repeating unit of the polyamide. Because the polyamides of the invention are formed from disecondary amines, the presence of such a hydrogen atom at that location is precluded. Such a hydrogen atom is present, however, in conventional nylon polyamides which are prepared from diprimary amines. It is postulated that, in such conventional polyamides, this hydrogen atom is available for, does participate in, a hydrogen bonding between the nitrogen atoms of two adjacent amide groups of two adjacent polymer molecules. It is postulated that this hydrogen bonding interferes with the suitable uniform dispersion of the dye-acceptor additive within the host polymer, thus drastically reducing the availability of sites for the dye molecules. Some support for this theory is found in Bellmeyer "Textbook of Polymer Chemistry," page 52(1957), Interscience Publishers, Inc., N.Y., which illustrates this form of hydrogen bonding between polymer molecules of commercial nylons. It is postulated that such bonding can also exist between such nylon molecules even when relatively small amounts of such nylons are dispersed in a host polyolefin.

Thus, the nonbasic polyamides of the invention are improved dye acceptor additives for polyolefins. They have been found highly suitable for improving the acceptance of a large number of dyes and are capable of many degrees of shading including intense coloring with may dyes, They have been found particularly appropriate with disperse dyes, including metallized-disperse dyes.

Accordingly, an object of this invention is to provide a method for producing polymeric compositions having improved dye receptivity.

Another object of this invention is to provide a polymeric composition having improved dye receptivity.

A further object of this invention is to provide novel compositions which can be mixed with polyolefins to improve their dye receptivity.

Other aspects, objects and the several advantages will become apparent to those skilled in the art from the following detailed description, drawings, and appended claims.

Figure 1:
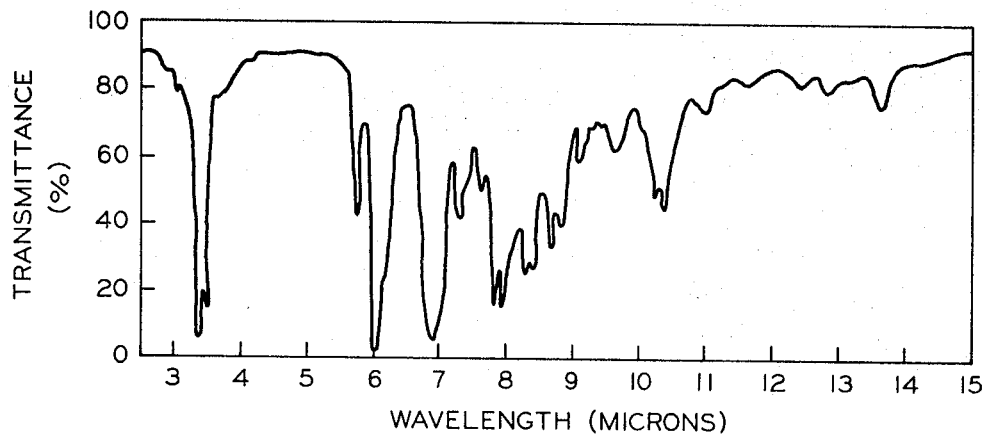
FIGS. 1 and 3 represent the infrared spectra of the polycondensation products of example I and II, respectively.

According to this invention, 100 parts by weight of at least one polymer or copolymer of a 1-olefin having two through eight carbon atoms per molecule is mixed with one to 20 parts by weight of a dye-receptive modifier comprising a nonbasic polyamide produced by polycondensing a diamine of which both amino groups are secondary with a hydrocarbon diacarboxylic acid to form a polymeric composition which has an improved dye receptivity.

The hydrocarbon dicarboxylic acids that can be used contains three through 36 carbon atoms and have the formula:

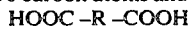

where R is a divalent hydrocarbon radical free from olefinic and acetylenic unsaturation. The radical can be acyclic, alicyclic, or aromatic and, if not aromatic, can contain substituent aromatic groups such as phenyl or naphthyl.

Representative examples of acids that can be used to produce the dye-receptive modifiers of this invention are malonic, succinic, glutaric, adipic, pimalic, suberic, azelaic, sebacic, 1,12-dodecaneodioic, 1,18-octadecanedioic, dimerized oleic acid, 3,3-dimethylglutaric, 2,2,4-trimethyladipic, 1,4-cyclohexanedicarboxylic, 3-phenyladipic, 4-α-naphthylsuberic, 1-naphthyl-2,4-cyclopentanedicarboxylic, phthalic, terephthalic, isophthalic, phenylenediacetic, 1,4-naphthalenedicarboxylic, 4-methylphthalic.

The complex diamines that can be used to produce the polyamides used in this invention are selected from the group having the general structural formula

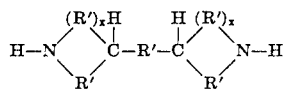

in which R' is selected from the group comprising (1) straight or branched alkylene groups and cycloalkyl- or aryl-substituted derivatives thereof having a total of one through 16 carbon atoms, (2) cycloalkylene groups and alkyl-cycloalkyl-, or aryl-substituted derivatives thereof having a total of four through 16 carbon atoms, or (3) arylene groups and alkyl-, cycloalkyl-, or aryl-substituted derivatives thereof having a total of six through 18 carbon atoms, R' being the same or different members of said R' group; x is 0 or 1.

Representative examples of disecondary amine compounds are: bis(2-pyrrolidyl)methane, bis(2-pyrrolidyl)propane, 2-piperidyl) methane, bis(4-piperidyl)methane, 2-piperidyl-(4-piperidyl)methane 1,3-di(5-ethyl-2-piperidyl) propane, 1,3-di(5-methyl-2-piperidyl)propane, 2,2-di(2-piperidyl)propane, 2,2-di(4-piperidyl)propane, 2(2-piperidyl)-2-(4-piperidyl)propane, 1,3-di(2-piperidyl) propane, 1,3-di(4-piperidyl)propane, 1-(2-piperidyl)-3-(4-piperidyl)-propane, 1,3-di(4-piperidyl)-2,2-dimethylpropane, 1,3-di(2-methyl-4-piperidyl)-propane, 1,3-di(4-piperidyl)-2-cyclohexylpropane, 1,3-di(4-piperidyl)-2,2-dicyclohexylpropane, 1,3-di(4-cyclohexyl-2-piperidyl)propane, 1,3-di(2,6-dicyclohexyl-4-piperidyl)propane, and the like.

Disecondary amine compounds, within the above general structural formula, which contain two piperidine rings are now preferred.

The dye-receptive modifiers of this invention can be prepared using mixtures of two or more of the diamines and two or more of the dicarboxylic acids described above. The operating conditions for the polycondensation reaction for the preparation of the nonbasic polyamides of the invention are well known, being described, for example, in U.S. Pat. No. 2,149,273, which issued on Mar. 7, 1939, and U.S. Pat. No. 2,130,947, which issued on Sept. 30, 1938. For the sake of completeness, the disclosures of those two patents are incorporated by reference herein. The reaction may be performed in one step or may include the formation of a salt as an intermediate step between the reaction of the initial ingredients and the production of the desired polyamides therefore as described in U.S. Pat. No. 2,130,947. For example, when one step reaction is used, the polyamide can be prepared by heating approximately equimolar amounts of disecondary amine and the hydrocarbon dicarboxylic acid at a temperature in the range of 210° to 575° F., preferably 300° to 540° F., in the presence or absence of suitable solvents or diluents with or without suitable condensing agents, at superatmospheric, atmospheric or subatmospheric pressure for periods of 0.1 to 50 hours. The reaction is preferably carried out in the absence of air and sometimes the addition of antioxidants is desirable. A small excess of the diamine or the dicarboxylic acid can be used to control the extent of reaction. It is presently preferred to use a small excess of the diacid. The product of reaction has an inherent viscosity in methyl alcohol or metacresol at 30° C. in the range of 0.05 to 1.0 dl./g.

Although the process of this invention is especially adaptable to crystalline polypropylene, it is also applicable to polymer and copolymers of other 1-olefins having two through eight carbon atoms, such as ethylene, butene-1,4-methylpentene-1, hexene-1, octene-1, and the like. A polymer or copolymer of these 1-olefins can be used individually or mixed with one or more other polymers or copolymers of 1-olefins. The polymer can be in the form of powder fluff, pellets, or any other form suitable for blending.

The blending of the polyolefin and the dye-receptive modifiers of this invention can be performed by simply admixing them in powder fluff, pellet, etc., form at room temperature in a ball mill, a Henschel-type apparatus, a Werner-type apparatus, or any other suitable apparatus, melt granulating the mix; and shaping same by extrusion, preferably in a melt spinning device while working in the absence of air and preferably under an inert gas. The polyolefin and dye-receptive modifiers can also be melt blended with conventional apparatus such as a Banbury mixer, a Brabender plastograph, a Davis-Standard extruder-pelletizer, and the like.

The blends can be shaped or spun, if desired, in the presence of a small amount of a suitable solid dispersing agent, such as benzoin, vinyl stearate, and the like, which promotes a homogeneous dispersion of the nitrogen-containing product in the mass of the olefin polymer.

It is within the scope of this invention to use a mixture of individual dye-receptive modifiers prepared from any of the above diamines or dicarboxylic acids and a mixture of mixed dye-receptive modifiers prepared from a mixture of any of the above diamines and dicarboxylic acids. The polyolefins and the dye-receptive modifiers may be admixed, either in dry form or in a suspending medium such as an alcohol, prior to the final blending operation. Small amounts of known antioxidants, fireproofing agents, ultraviolet stabilizers, delustrants, antistatic agents, optical brighteners, inhibitors, and the like can be present in the olefin polymer, or can be added during the blending operation, or added to the blend material anytime prior to fabrication of the finished article.

The compositions of this invention can be made into filaments by either conventional extrusion techniques or by forming the blended materials into a film, orienting the film by stretching in at least one direction, and fibrillating the oriented film to form filaments. Any conventional technique for fibrillating oriented plastic film, such as passing between rotating wire brushes, flailing, subjecting to an acoustical field, beating and the like can be used.

The filaments, which are prepared from the blends according to this invention, can be mono- or multi-filaments and can be used for the preparation of continuous bulk or staple yarn. The filaments can be further treated to effect added improvement of their dyeability and fastness of dyeing. Particularly suitable for this purpose are the treatments with formaldehyde, diisocyanates, monomers capable of giving tridimensional structures, such as divinylbenzene, vinyl acetates, and similar compounds, or treatments with diepoxy compounds.

When fibers are produced from the composition of this invention by extrusion, they are stretched or drawn, using suitable stretching ratios, e.g., range of 1:2 to 1:20 at temperatures in the range of about 175° to 305° F., in drawing devices heated with warm air, steam, or similar fluids. Although not limited thereto, spinning of the composition of this invention is preferably performed by extrusion through spinnerettes.

The fibers produced from compositions of this invention have improved receptivity to dyes, being receptive to acid, disperse, metallized, reactive, basic and vat dyes, and particularly receptive to the disperse and metallized dyes. The color intensity is much greater than that obtained from polyolefins blended with conventional, commercial polyamides, such as nylon. A marked advantage of the dye-receptive modifiers of this invention is that they have "buildup" potential—i.e., an increase in the amount of dye-receptive modifiers in the fiber or of dye in the dye bath results in the production of darker shades. Although the process of this invention has been described with particular reference to polyolefin fibers, it is also suitable for improving the dye receptivity of the polyolefin compositions of various shapes. Compositions of this invention are also useful for the preparation of other shaped articles such as films, tapes, sheets, and in general, articles of any shape and size where improved dye receptivity is desired.

The following examples are presented to further illustrate and clarify the present invention, and are in no way to be construed as limiting the invention thereto.

Example I

Figure 2:
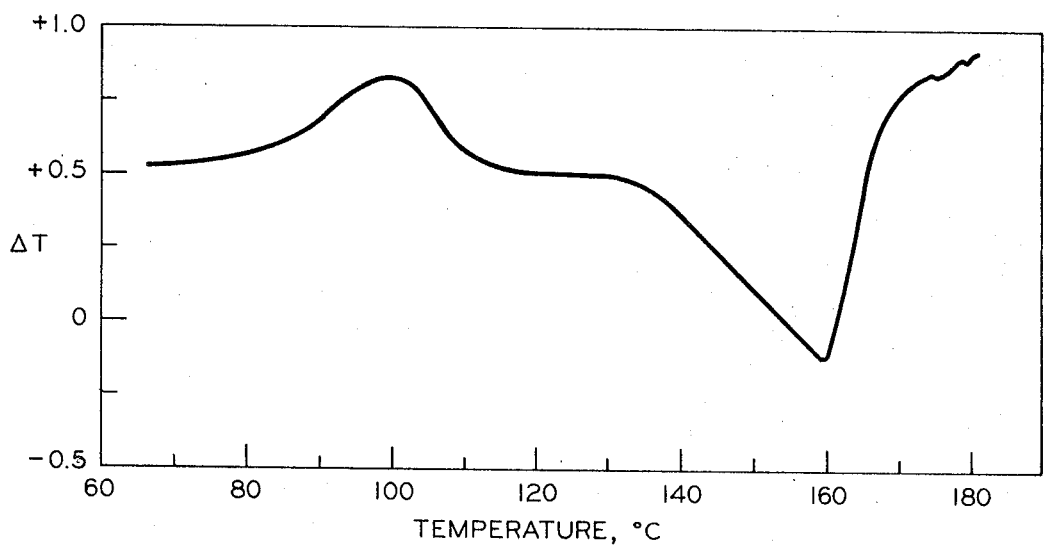
FIGS. 2 and 4 represent the differential thermal analysis of the polycondensation products of examples I and II, respectively.

A mixture of 0.1 gram mol of 1,3-di(4-piperidyl)propane, 0.11 mol of adipic acid, and 2 mols of water was heated to 212° F. in a 150-milliliter reactor to remove water. The mixture was further heated to 450° F. and maintained at that temperature for approximately 3.5 hours. During the last 2 hours that the mixture was maintained at the above elevated temperature, a vacuum of about 20 inches of mercury was applied to the reactor. The product of polycondensation reaction was cooled, dissolved in and recrystallized from methyl alcohol. The product had an inherent viscosity in methyl alcohol at 30° C. of 0.2 dl./g. The infrared spectrum and differential thermal analysis of the product are shown in FIGS. 1 and 2. The inherent viscosity for this product and those prepared in the following examples was determined with a Cannon-Fenske No. 75 viscometer. The infrared spectrum for this product and those prepared in the following examples was determined with a Perkin-Elmer Infracord Model 137 infrared spectrometer and the differential temperature analysis for the product and those in the following examples was determined with a duPont 900 Differential Thermal Analyzer.

Example II

Figure 3:
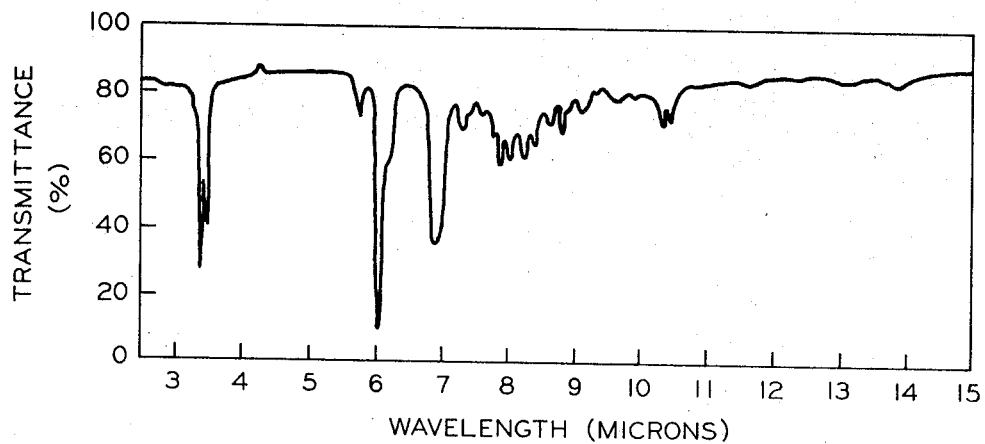
Figure 4:
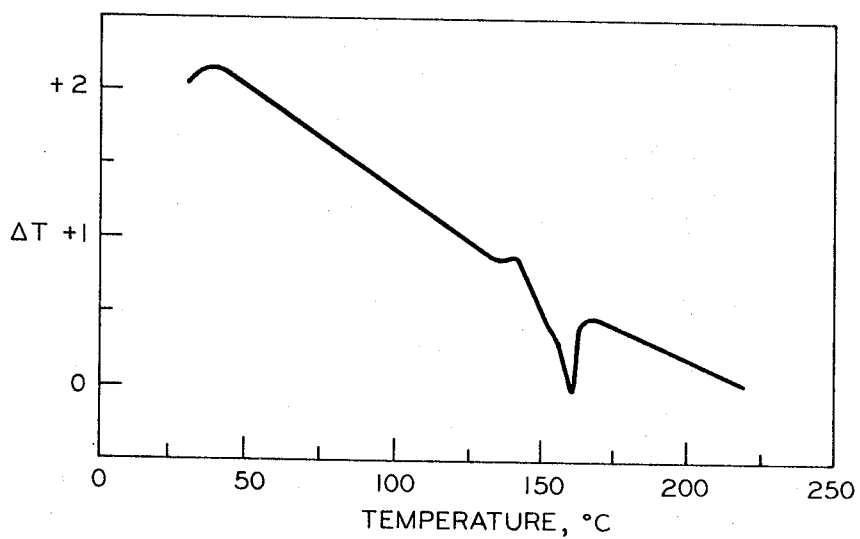

The procedure of example I was followed with a starting mixture comprising 0.1 gram mol of 1,3-di(4-piperidyl)propane, 0.11 mol of sebacic acid, and 2.4 mols of water. The product has an inherent viscosity in metacresol at 30° C. of 0.4 dl./g. The infrared spectrum and differential thermal analysis of the product are shown in FIGS. 3 and 4.

Example III

Finely divided polypropylene with a melt flow of approximately 3 dg./min. (ASTM D 1238-62-T, Condition L) and a density of 0.905 g./cc. (ASTM D 1505-63-T) was prepared using a diethylaluminum chloride - $TiCl_3 \cdot 1/3 \; AlCl_3$ catalyst. The abbreviation "php" as used hereinafter represents parts by weight per 100 parts of polypropylene. Portions of the polypropylene were mixed in methyl alcohol, after 0.05 php 2,6-di-tert-butyl-4-methylphenol, 0.15 php octadecyl ester of 3-(3,5-di-tert-butyl-4-hydroxy) phenylpropionic acid, 0.3 php distearyl-thiodipropionate, and 0.05 php calcium stearate had been added thereto, and blended into separate samples with: (1) 4.3 php of the polyamide prepared in example I, (2) 5.4 php of the polyamide prepared in example II, (3) 3.1 php of Zytel 61 (a terpolymer of nylon 6, nylon 66, and nylon 610 ) and (4) 5.0 php of nylon 1210. These additive levels of the polyamides resulted in a nitrogen content of 0.38 weight percent for each sample. After being warmed to remove the methyl alcohol, the samples were pelletized in a Davis-Standard extruder-pelletizer at 425° F. The pellets from each sample were melt spun into 18-filament yarns in a Chemtex spinning machine and drawn at 240°-280° F. with a draw ration of 3.5–4:1 to produce 3-denier filaments. These yarns were knit into circular sleeve fabrics on a 260-needle Morris Speizman knitting machine.

Example IV

Portions of the fabrics of example III were dyed in a Gibbs dye bath at a 50:1 water to fabric weight ratio containing 6 percent Eastman Blue BNN disperse dye calculated on the weight of the fabric. The dye bath also contained 0.5 weight percent of an alcohol ether sodium sulfate, anionic textile detergent, Duponol RA, calculated on the weight of the dye. The pH of the dye bath was adjusted to 5 by the addition of formic acid. The fabric samples were dyed by submerging same in the dye bath and raising the temperature of the bath to 205° F. where it was maintained for 1 hour. The fabric samples were removed from the dye bath, rinsed with running water until clear, and after-scoured in a 1 g./liter solution of Duponol RA for 15 minutes at 120° F. The color obtained on the fabric samples made from the blends with the polyamides prepared in examples I and II was much more intense than that obtained from blends with Zytel 61 and nylon 1210 and the fastness of the dyeing of the sample fabrics to light, washing, and rubbing was very satisfactory.

EXAMPLE V

Separate portions of the fabric samples of example III were dyed with a second disperse dye, duPont Latyl Orange, in exactly the proportions and manner as in example IV, with the same general results.

From these data it can be seen that the composition produced by the process of this invention has improved dye receptivity over that available with conventional polyolefin/polyamide blends.

EXAMPLE VI

In this example the nonbasic polyamide of example I was incorporated into polypropylene at a loading of 4.28 php and the nonbasic polyamide of example II was incorporated into polypropylene at a loading of 5.4 php. These two modified polypropylenes were processed into fabric, as in earlier examples, and were dyed, also as in earlier examples, except that the dyeing was carried out at the 2 percent level.

For purposes of comparison, two prior art and commercially available dye-acceptor additives were similarly incorporated into polypropylene and processed into fabrics. One commercial additive, GIQ (Uniroyal Inc.), was a copolymer of 2-vinylpyridine and 2-methyl-5-vinylpyridine. It was incorporated into polypropylene at 3 php. The other commercial additive, GANEX V-220 (GAF Corp. was a low molecular weight, alkylated poly(N-vinylpyrrolidone). It was incorporated into polypropylene at 6 php.

All four of the modified polypropylenes were comparable in that they were formulated to contain essentially identical nitrogen content (0.4 weight percent).

The results of the dyeing comparison tests were shown in the following table

Table 1

| Dye acceptor additive | Ranking for Eastman blue dye | Ranking for Latyl orange dye |
|---|---|---|
| Example I, Polyamide | 1 | 1 |
| Example II, Polyamide | 2 | 2 |
| GIQ | 3 | 3 |
| GANEX | 4 | 4 |

The results of the above table show that, at equal nitrogen content, the invention dye-acceptor polyamides rank higher than the two commercial products for each of two different dyes.

EXAMPLE VII

To further demonstrate the effectiveness of the dye-acceptor additive of the present invention three of the modified polypropylene fabrics described in the preceding example were dyed with each of 17 different disperse dyes at the 6 percent level. The results of these tests are shown in the following table.

Table 2

Disperse Dyeing Evaluation

Dye Reception Scale Rating[a]

| Dye | Example I Polyamide | GANEX | GIQ |
|---|---|---|---|
| Palanil Yellow R | 8 | 3–4 | 5 |
| Acetamine Yellow CG | 7 | 6 | 5 |
| Palanil Yellow G | 7–8 | 6 | 5 |
| Latyl Orange 3R | 8–9 | 6–7 | 5 |
| Palanil Orange S | 8–9 | 6–7 | 5 |
| Celliton Fast Pink 175 103 | 8–9 | 5–6 | 5 |
| Polydye Red BC | 7–8 | 6–7 | 5 |
| Setacyl Red R | 8–9 | 7–8 | 5 |
| Setacyl Scarlet RNA | 8–9 | 3–4 | 5 |
| Resolin Red FB | 8 | 6 | 5 |
| Latyl Violet BN | 6 | 7 | 5 |
| Celanthrene Blue FFS | 7–8 | 3 | 5 |
| Eastman Blue BNN | 8 | 5 | 5 |
| Foron Navy S–2GL | 5–6 | 4–5 | 5 |
| Celliton Fast Green B | 8 | 4 | 5 |
| Avilon Fast Brown GRW | 8 | 6–7 | 5 |
| Acetamine Diazo Black RB | 6 | 7–8 | 5 |

[a] GIQ arbitrarily given rating of 5. Rating of others is relative to GIQ on a 0–10 scale.

The results of the dyeing tests shown in the table above clearly demonstrate the suitability of the invention additives for use with a large number of different dyes. The results also show that the invention additive is substantially superior, in this regard, to the two prior art and commercial additives. It was also observed that the knit fabrics of the invention composition were generally smoother of the other two comparison compositions.

EXAMPLE VIII

The following tests are present in order to demonstrate the superiority of the nonbasic polymers of the present invention over other closely related but basic polymers. The superiority in this instance is in terms of stability during processing in the presence of air. Six polymers were prepared in a manner closely analogous to example I by reaching a dicarboxylic acid with a diamine. The diacids, the diamines, and the repeating units of the resulting polymer are shown in table 3.

It can be readily be seen from the structural formulas in table 3 that the diamine of polymers 1 and 2 are secondary diamines and both these secondary amine groups participate in the polycondensation reaction such that the repeating unit of the resulting polyamide contains no residual basic amine groups, but contain merely essentially neutral amide groups. Polymers 1 and 2 are nonbasic polyamides of the present invention.

On the other hand, the diamine of polymers 3 and 4 shows the presence of both a secondary amino group and a tertiary amino group. Consequently, only the secondary amino group participates in the polycondensation reaction and the resulting polyamidoester is a basic polymer because the repeating unit contains a basic tertiary amine group.

In like manner the diamine of polymers 5 and 6 is seen to contain two tertiary amino groups none of which participate in the polycondensation reaction. The resulting polymer is a

TABLE 3

| Polymer No. | Diamine | Diacid | Repeating unit |
|---|---|---|---|
| 1 | H–N⟨⟩–(CH₂)₃–⟨⟩–N–H | Adipic | –[C(O)–(CH₂)₄–C(O)–N⟨⟩–(CH₂)₃–⟨⟩–N]– |
| 2 | Same as above | Sebacic | –[C(O)–(CH₂)₈–C(O)–N⟨⟩–(CH₂)₃–⟨⟩–N]– |
| 3 | HO–(CH₂)₂–N⟨⟩–(CH₂)₃–⟨⟩–N–H | Adipic | –[C(O)–(CH₂)₄–C(O)–O–(CH₂)₂–N⟨⟩–(CH₂)₃–⟨⟩–N]– |
| 4 | Same as above | Sebacic | –[C(O)–(CH₂)₈–C(O)–O–(CH₂)₂–N⟨⟩–(CH₂)₃–⟨⟩–N]– |
| 5 | HO–(CH₂)₂–N⟨⟩–(CH₂)₃–⟨⟩–N–(CH₂)₂–OH | Adipic | –[C(O)–(CH₂)₄–C(O)–O–(CH₂)₂–N⟨⟩–(CH₂)₃–⟨⟩–N–(CH₂)₂–O]– |
| 6 | Same as above | Sebacic | –[C(O)–(CH₂)₈–C(O)–O–(CH₂)₂–N⟨⟩–(CH₂)₃–⟨⟩–N–(CH₂)₂–O]– | polyester which is basic due to the presence of two residual tertiary amino groups.

Each of the six polymers was compounded into polypropylene at the 3 php level in an identical manner. Each compounding formulation contained, in addition to the dye acceptor polymer, a conventional "package" of antioxidant additives similar to that of example III.

The ingredients in each formulation were first dry blended with the particulate polypropylene and the dry blended mixture was then placed on heated rolls for roll mill blending at 350° F. for 5 minutes. It was observed that as soon as polymers 3, 4, 5, and 6 melted on the hot rolls, they became discolored, turning a very dark maroon color. The nonbasic polyamides of polymers 1 and 2 on the other hand, suffered no significant change in color and appeared to be free of this processing instability problem experienced by the other four basic polymers.

In another test, polymers 3, 4, 5 and 6 were again compounded into polypropylene at a level of 4.5, 5.3, 5.15, and 5.87 php, respectively. Each compounding formulation again had a similar "package" of antioxidant additives as well. As a control a sample of polypropylene containing the antioxidants but without the presence of a dye-acceptor additive was also tested.

Each of these formulations was first dry blended and then pelletized by passage through a conventional extruder and pelletizer operating at about 450° F. The pelletizing operation produced much color in the formation containing polymers 3, 4, 5, and 6. The control formulation, on the other hand, was satisfactorily pelletized without developing significant color.

The above tests show that polypropylene containing even small amounts of basic polymers, that is, polymers containing free amine groups, are sensitive to the high-temperature processing operations and must be carefully protected from contact with air or oxygen while undergoing such conventional processing. The nonbasic polymers of the present invention, on the other hand, do not exhibit this sensitivity and can be conveniently used in conventional polyolefin formulations and processed in conventional apparatus under a variety of conventional conditions.

Reasonable variation and modification are possible within the scope of the foregoing disclosure, the drawings and the appended claims to the invention the essence of which is that a nonbasic polyamide, as described, prepared by polycondensing a hydrocarbon dicarboxylic acid, as described, with a diamine, both amino groups of which are secondary, have been found to compound or blend with a polyolefin, as described, to produce a composition having improved dye receptivity.

I claim

1. A polymeric composition having a high dye receptivity comprising a blend of (a) 99 to 83.3 percent by weight of at least one polymer or copolymer of 1-olefins having two through eight carbon atoms per molecule, and (b) 1 to 16.7 percent by weight of a nonbasic polyamide dye-receptive modifier, said modifier being prepared by polycondensing at least one hydrocarbon dicarboxylic acid containing three to 36 carbon atoms and having the general formula:

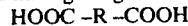

where R is a divalent hydrocarbon radical free from olefinic or acetylenic unsaturation and at least one complex diamine selected from the group having the general formula:

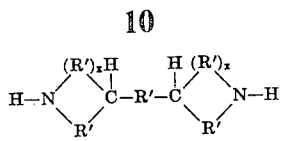

in which R' is selected from the group comprising (1) straight or branched alkylene groups and cycloalkyl- or aryl-substituted derivatives thereof having a total of one through 16 carbon atoms, (2) cycloalkylene groups and alkyl-, cycloalkyl-, or aryl-substituted derivatives thereof having a total of four through 16 carbon atoms, or (3) arylene groups and alkyl-, cycloalkyl-, or aryl-substituted derivatives thereof having a total of six through 18 carbon atoms, R' being the same or different members of said R' group; x is 0 or 1.

2. A composition according to claim 1 wherein said 1-olefin is crystalline polypropylene.

3. A composition according to claim 2 wherein said diamine is 1,3-di(4-piperidyl)propane.

4. A composition according to claim 2 wherein said dicarboxylic acid is adipic acid.

5. A composition according to claim 2 wherein said dicarboxylic acid is sebacic acid.

6. A composition according to claim 2 wherein said diamine is 1,3-di(4-piperidyl)propane and said dicarboxylic acid is adipic acid.

7. A composition according to claim 2 wherein said diamine is 1,3-di(4-piperidyl)propane and said dicarboxylic acid is sebacic acid.

8. A process for producing a dye-receptive polymeric composition comprising mixing 100 parts by weight of at least one polymer or copolymer of a 1-olefin having two through eight carbon atoms per molecule with one to 20 parts by weight of a material prepared by polycondensing at least one hydrocarbon dicarboxylic acid containing three through 36 carbon atoms and having the general formula:

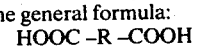

where R is a divalent hydrocarbon radical free from olefinic or acetylenic unsaturation, and at least one complex diamine selected from the group having the general formula:

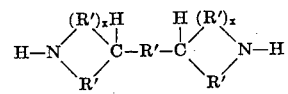

in which R' is selected from the group comprising (1) straight or branched alkylene groups and cycloalkyl- or aryl-substituted derivatives thereof having a total of one through 16 carbon atoms, (2) cycloalkylene groups and alkyl-, cycloalkyl-, or aryl-substituted derivatives thereof having a total of four through 16 carbon atoms, or (3) arylene groups and alkyl, or aryl-substituted derivatives thereof having a total of six through 18 carbon atoms, R' being the same or different members of said R' group; x is 0 or 1.

9. The process according to claim 8 wherein said 1-olefin is crystalline polypropylene.

10. The process according to claim 9 wherein the said material is the polycondensation product of adipic acid and 1,3-di(4-piperidyl)propane.

11. The process according to claim 9 wherein said material is the polycondensation product of sebacic acid and 1,3-di(4-piperidyl)propane.

* * * * *